United States Patent [19]
Armond et al.

[11] Patent Number: 5,267,119
[45] Date of Patent: Nov. 30, 1993

[54] ELECTRIC PERMANENT MAGNET CHUCK CONTROL

[75] Inventors: Joseph A. Armond, River Grove; Juanito Rodenas, Carol Stream, both of Ill.

[73] Assignee: Electro-Matic Products Co., Ill.

[21] Appl. No.: 708,376

[22] Filed: May 31, 1991

[51] Int. Cl.⁵ .............................................. H01F 13/00
[52] U.S. Cl. .................................. 361/145; 361/144; 361/147
[58] Field of Search ............................. 361/143-145, 361/147; 335/285, 288, 289, 290, 291, 295

[56] References Cited

U.S. PATENT DOCUMENTS

| | | | |
|---|---|---|---|
| 3,579,053 | 5/1971 | Littwin | 361/145 |
| 4,306,269 | 12/1981 | Bacchiere et al. | 361/149 |
| 4,370,693 | 1/1983 | McDonald et al. | 361/145 |
| 4,402,032 | 8/1983 | Wilterdink | 361/145 |
| 4,633,361 | 12/1986 | Ela et al. | 361/145 |
| 4,771,358 | 9/1988 | Millner | 361/145 |
| 4,843,516 | 6/1989 | Armond et al. | 361/145 |

*Primary Examiner*—Jeffrey A. Gaffin
*Attorney, Agent, or Firm*—Paul H. Gallagher

[57] ABSTRACT

Apparatus for demagnetizing and magnetizing a chuck, having circuitry for connection with a 3-phase 4-line AC source, and including a power circuit and a control circuit. The power circuit leads directly from the source to the chuck, without transformers and capacitors. The three phases of the AC are individually impressed on the chuck, at corresponding angles, and rectifiers rectify the current at each phase. The circuitry will accommodate a single chuck, or selective ones of multiple chucks (e.g., nine). The voltage provided by the source is of a predetermined value (e.g., 230 V) and voltage of a greater value (e.g., 290 V) can be applied for demagnetizing. Solid state controls are provided, the individual phases of the current, for controlling greater and lesser voltages, and for putting a single chuck, or selected ones of multiple chucks, in circuit.

15 Claims, 11 Drawing Sheets

ELECTRIC PERMANENT MAGNET CHUCK CONTROL

FIELD OF THE INVENTION

The invention resides in the broad field of demagnetizing parts that were previously magnetized. The invention has most use in industry, where heavy parts are held in place by a magnet, such as on a grinder, and when they are to be released, they are demagnetized, along with the chuck by which they are held.

SUMMARY OF THE INVENTION

In considering the demagnetizing of a magnetic chuck, the counterpart thereof, magnetizing, must also be considered. While the demagnetizing aspect alone is the primary objective of the apparatus, after a chuck has been demagnetized, for releasing the workpiece, it must be magnetized again for the continued functioning of holding parts thereon. The same apparatus utilized for demagnetizing chuck, is of course utilized for again magnetizing it, and the present apparatus performs both of those functions or steps, and accordingly is referred to as control apparatus.

In the trade the terms magging and demagging are used quite generally to mean magnetizing and demagnetizing respectively, and are so used at times herein.

The apparatus of the invention has to do particularly with electric permanent magnet chucks, which are magnetized in only one direction, i.e., one direction of polarization. A permanent magnet has a natural magnetic force which is polarized in a predetermined direction. To demagnetize the chuck, a demagnetizing charge is applied to the chuck, in direction opposite to the direction of the original charge on the chuck. Because of the natural direction of the polarity of the charge on the chuck, the chuck is to be demagnetized in a single step, that is, to reduce the charge to zero in that single step. This is in contrast to a series of steps in which a series of reverse charges are applied, of successively reduced values. In the latter case, the charge in the individual steps is extended beyond zero in the opposite direction, but in the present case, because of the natural polarization of the permanent magnet, it is desired that the reverse charge not be extended beyond zero.

A broad object of the invention therefore is to provide a novel apparatus for applying a charge to a permanent magnet chuck, both in charging direction and in discharging direction.

Another object is to provide such apparatus of 3-phase AC in which there are no power transformers or capacitors between the source of power and the chuck to be demagnetized.

A further object is to provide apparatus of the character just referred to capable of applying a demagnetizing charge to a chuck of a value greater than the voltage value of the original source; specifically the source is capable of applying an original magnetizing charge to the chuck in one direction of a predetermined value, e.g., 230 V, and a charge in the opposite direction, for discharging the chuck, of a greater value, e.g., 290 V.

Still another object is to provide an apparatus of the character just referred to which, in applying a charge to the chuck of greater value than that of the original source, the voltages of the three phases are added together (partially) to produce the voltage that is higher than the source.

A still further object is to provide apparatus of the character just referred to, that includes a specific arrangement of SCRs, which are held to a certain level in the charging of the chuck, and enabled to operate at a higher level, in the discharging or demagnetizing.

DETAILED DESCRIPTION

Figure 1:
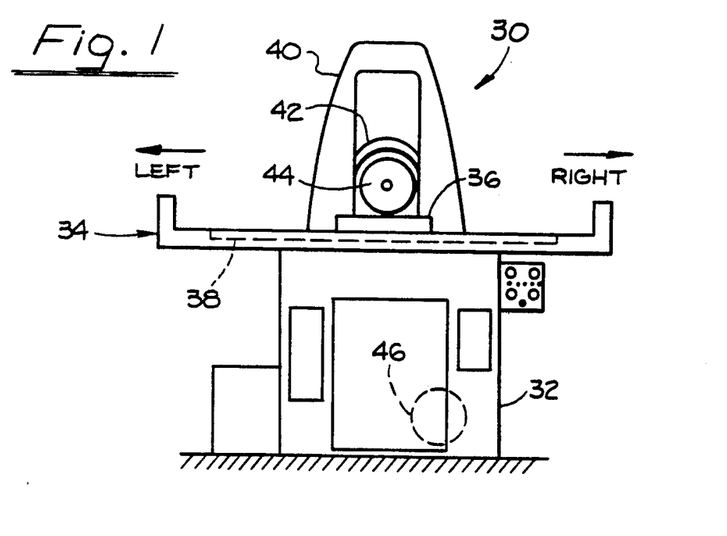
FIG. 1 is a view of a grinder to which the apparatus of the present invention is applied.
Figure 2:
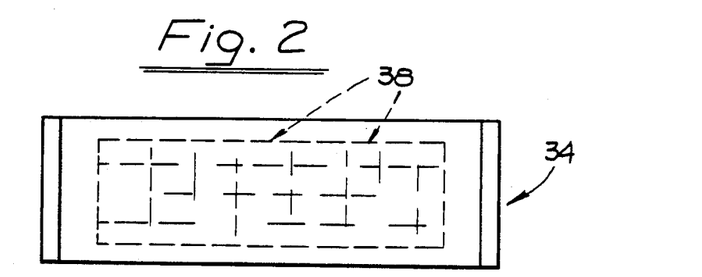
FIG. 2 is a top view of the table of the grinder indicating a chuck therein.
Figure 3:
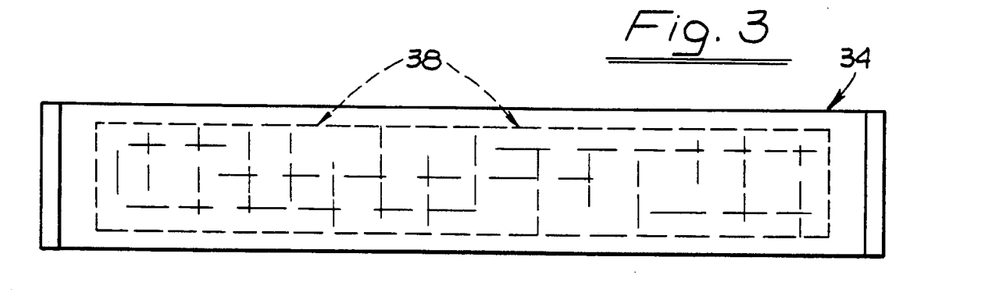
FIG. 3 is a view similar to FIG. 2 but showing a table with a greater number of chucks therein.
Figure 4:
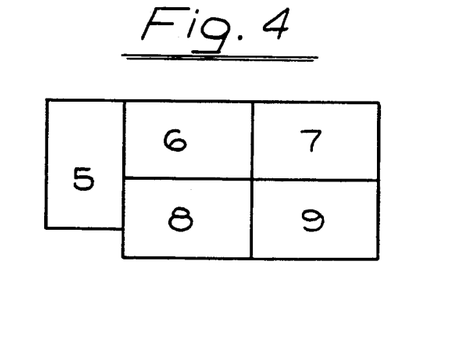
FIG. 4 is a layout of the positional relationship of FIGS. 5-9.
Figure 4A:
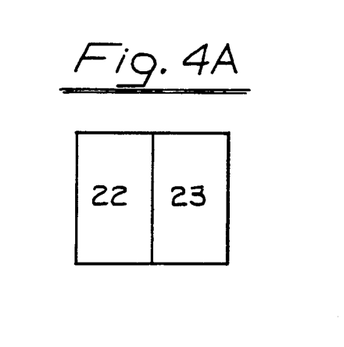
FIG. 4A is a relationship of the positional layout of FIGS. 22-23.

FIG. 1 shows a standard surface grinder 30 having a base 32 on which is mounted a table 34 supporting a workpiece 36 to be ground. The workpiece is held on the table by a magnetic chuck 38. The grinder includes a column 40 at the rear in which is mounted a vertically movable grinding head 42 that includes a grinding wheel 44. FIGS. 2 and 3 show single-chuck and multi-chuck arrangements referred to again hereinbelow.

In the operation of the grinder, the grinding head is lowered to bring the grinding wheel into engagement with the workpiece for the grinding operation. In this grinding operation, the table 34 is reciprocated horizontally in right/left directions, as indicated, to move the workpiece past the grinding wheel, as the grinding wheel rotates in engagement therewith. Such a standard grinder is provided with certain driving means and controls, including for example a motor 46 for driving the table. Most of the controls for the standard operation of the grinder are not referred to specifically herein, but reference is made to certain ones responsive to the necessary operating condition of the present apparatus. Attention is directed to various controls in the electrical circuits for controlling the chuck 38 and demagnetizing and magnetizing the chuck and workpiece thereon.

Figure 5:
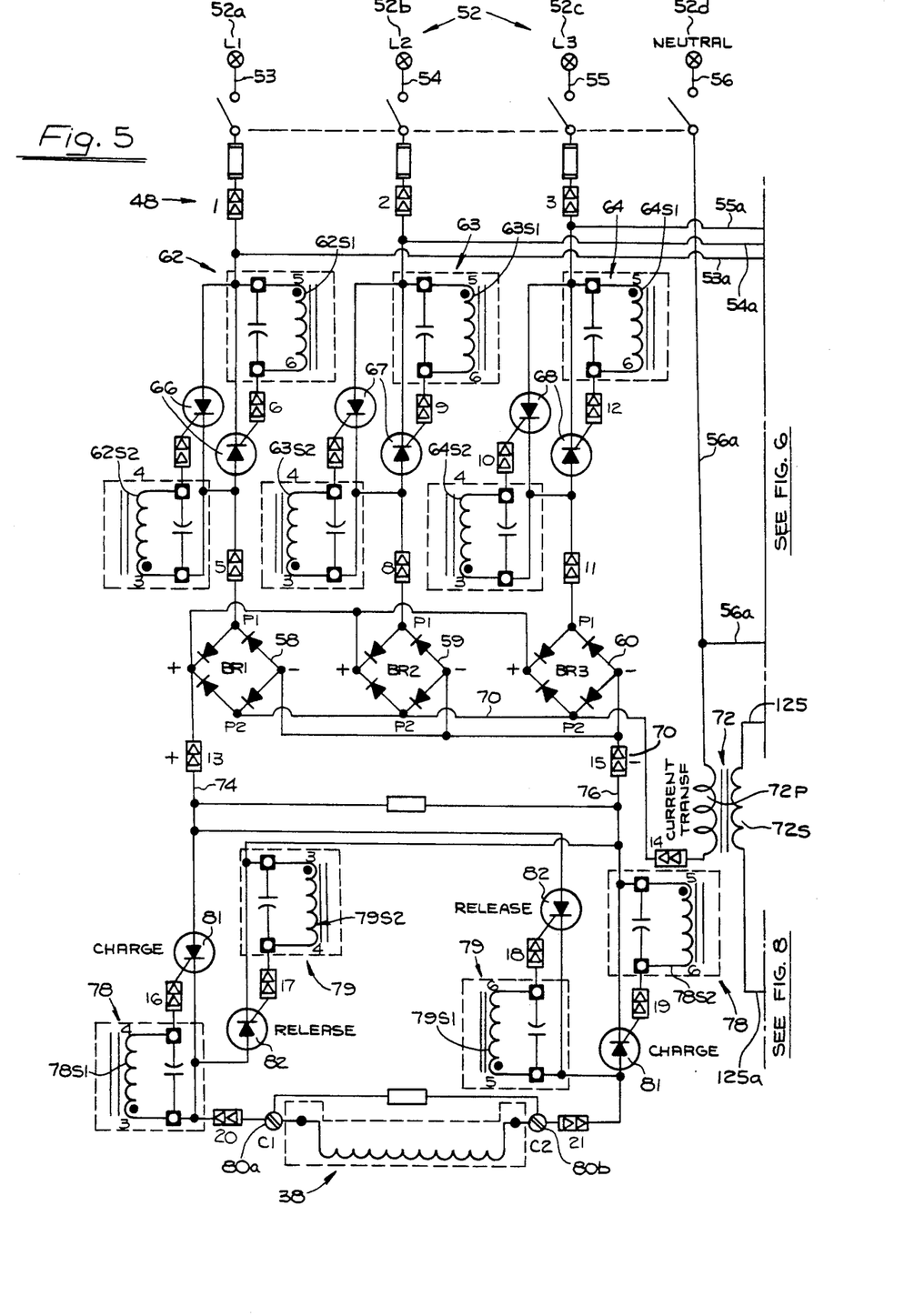
FIG. 5 is a portion of the main electrical circuit.

Attention is directed first to the electrical circuit of FIGS. 5-9. This circuit is arranged for controlling both the single chuck 38 as represented in FIG. 2 and the multiple chucks of FIG. 3, and also additional circuits are arranged for selectively controlling the plurality of chucks. The single chuck 38 is shown at the bottom of FIG. 5.

Referring first to the electrical circuit of FIGS. 5-9, this circuit includes a power circuit 48 shown in FIG. 5, and a control circuit 50 shown in FIGS. 6-9.

The power circuit is utilized for energizing and de-energizing the chuck, and the control circuit for controlling the power circuit. The circuitry includes a 3-phase 4-line MAIN AC power source 52, of 230 V, or other power voltages available, including power lines 52a, 52b, 52c, corresponding to the three phases and a neutral line 52d; the power circuit includes input lines 53, 54, 55, leading from the power lines to respective rectifiers 58, 59, 60, and a return line 56 leading from the rectifiers to the neutral line.

Figure 6:
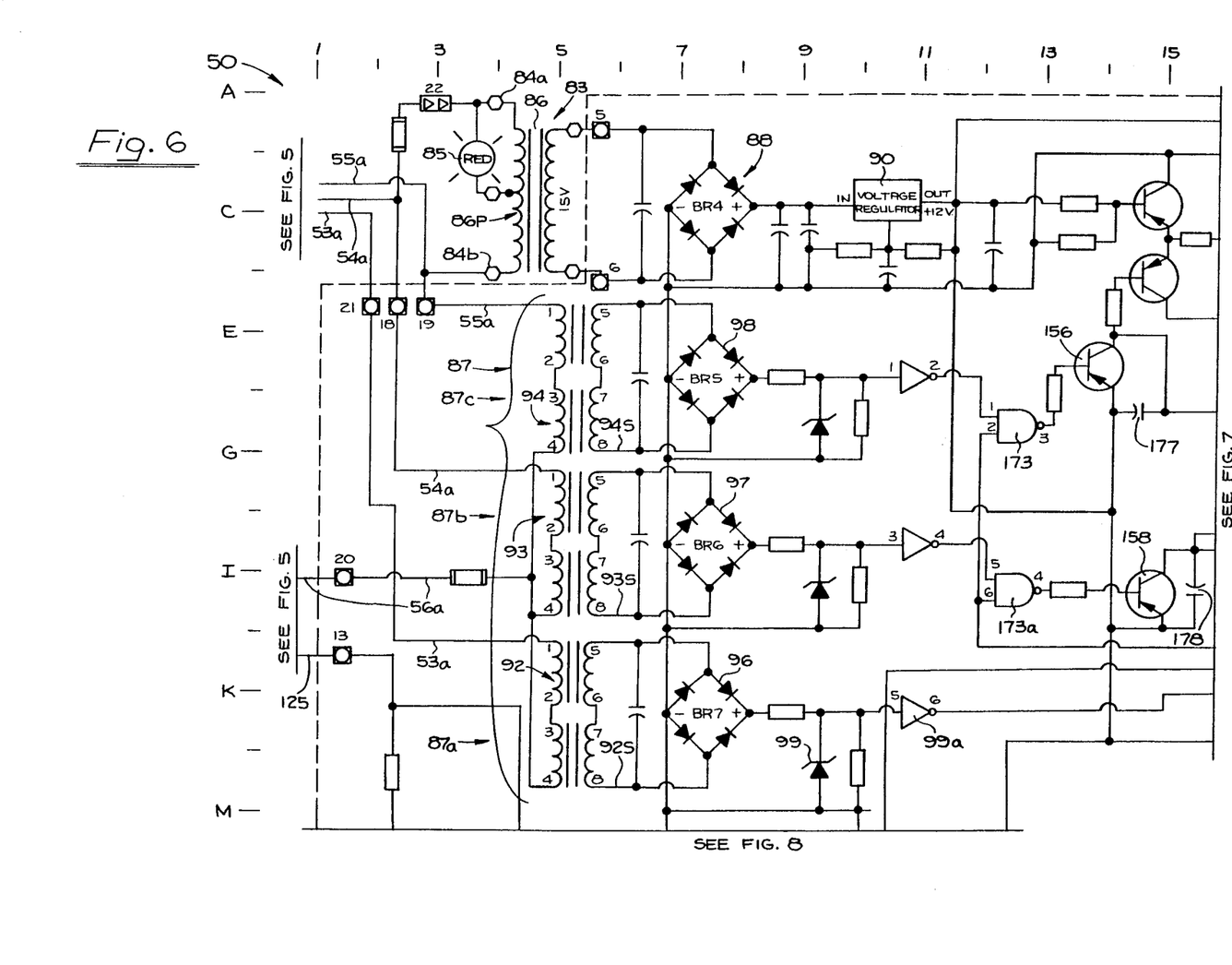
FIG. 6 is a portion of the main electrical circuit.

FIG. 5 also shows lines 53a, 54a, 55a leading to the control circuit (FIG. 6). Another line 56a (FIG. 5) is connected with the neutral line 56, this leading from certain transformers in the control circuit (FIG. 6). These elements will be referred to again hereinbelow.

Certain of the circuits are provided with coordinates, letters and numbers, for indicating the locations of various elements in the circuits, and reference may be made to these coordinates, generally without necessarily referring to the figure numbers.

The input lines 53, 54, 55 are individually controlled by pulse transformers 62, 63, 64, respectively, and SCRs 66, 67, 68, there being one transformer/SCR in each input line and thus for each phase of the 3-phase AC.

In the identification of the various components, transformers are identified with principal reference numerals, the primaries thereof with the same reference numeral and postscript P, and the secondaries with the same principal numeral but with the postscript S. In the case of relays, each is identified with a main reference numeral, the coil is identified with the same numeral and the postscript a, and the contacts with the same reference numeral but with the postscripts b, c, etc. Transistors, SCRs, diodes, and gates may also be referred to generically as valves.

Figure 7:
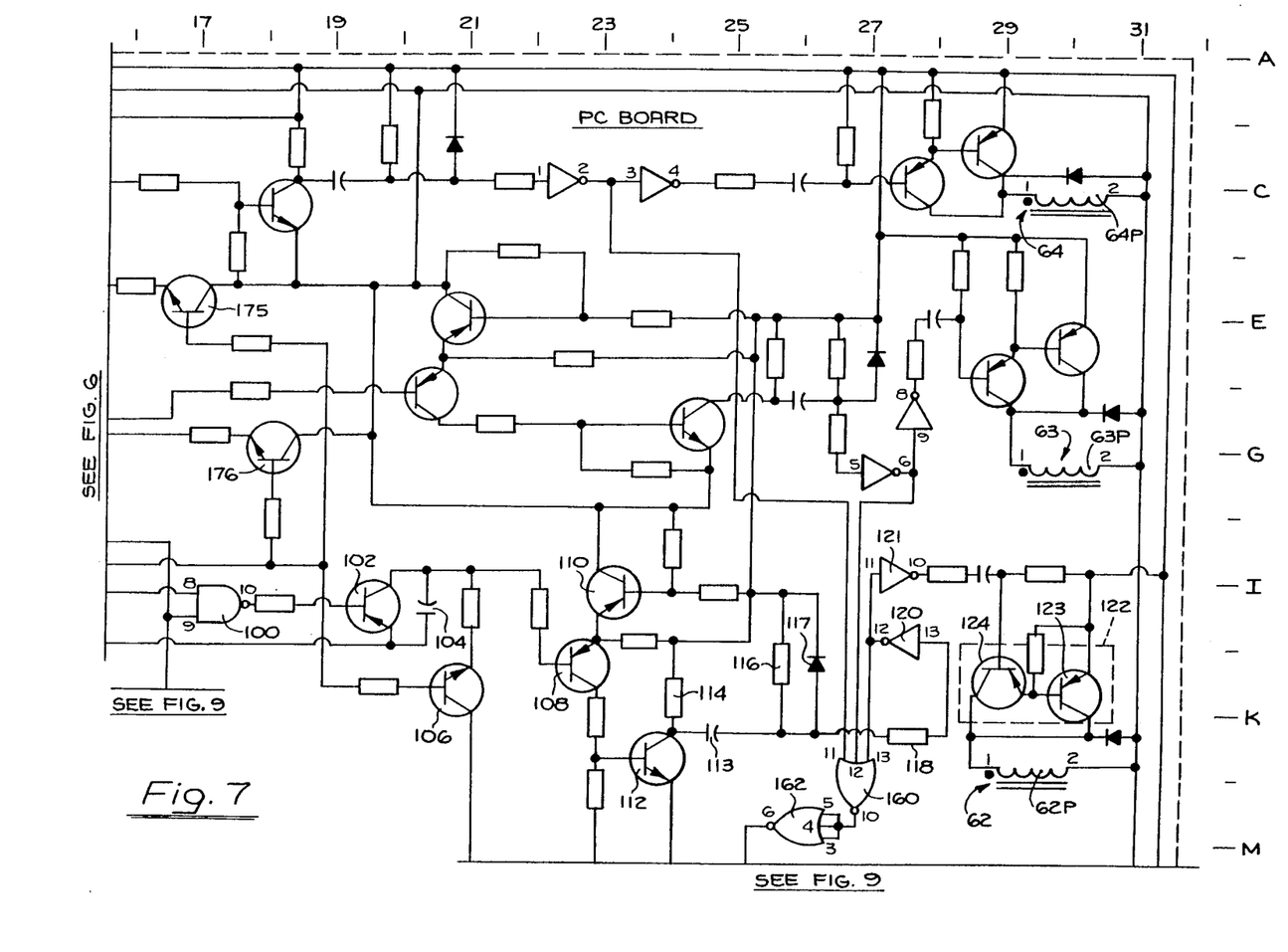
FIG. 7 is a portion of the main electrical circuit.

Referring to the pulse transformers 62, 63, 64, the secondaries thereof are shown in FIG. 5 while the primaries are shown in FIG. 7, right (L-29, G-29, C-29), the SCRs 66, 67, 68, are associated with the respective secondaries shown in FIG. 5, oriented in respective directions of the AC half-cycles.

Figure 8:
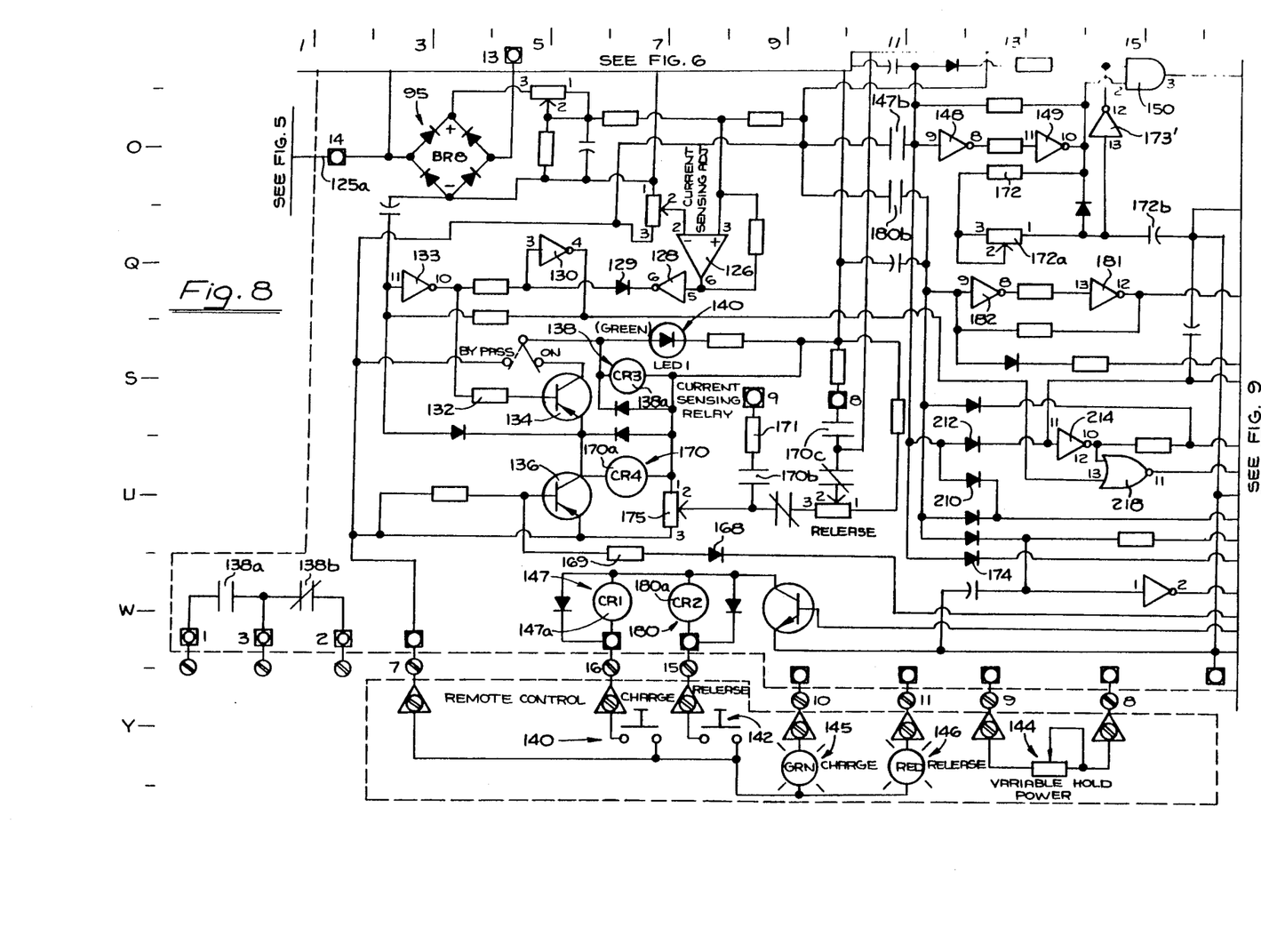
FIG. 8 is a portion of the main electrical circuit.
Figure 9:
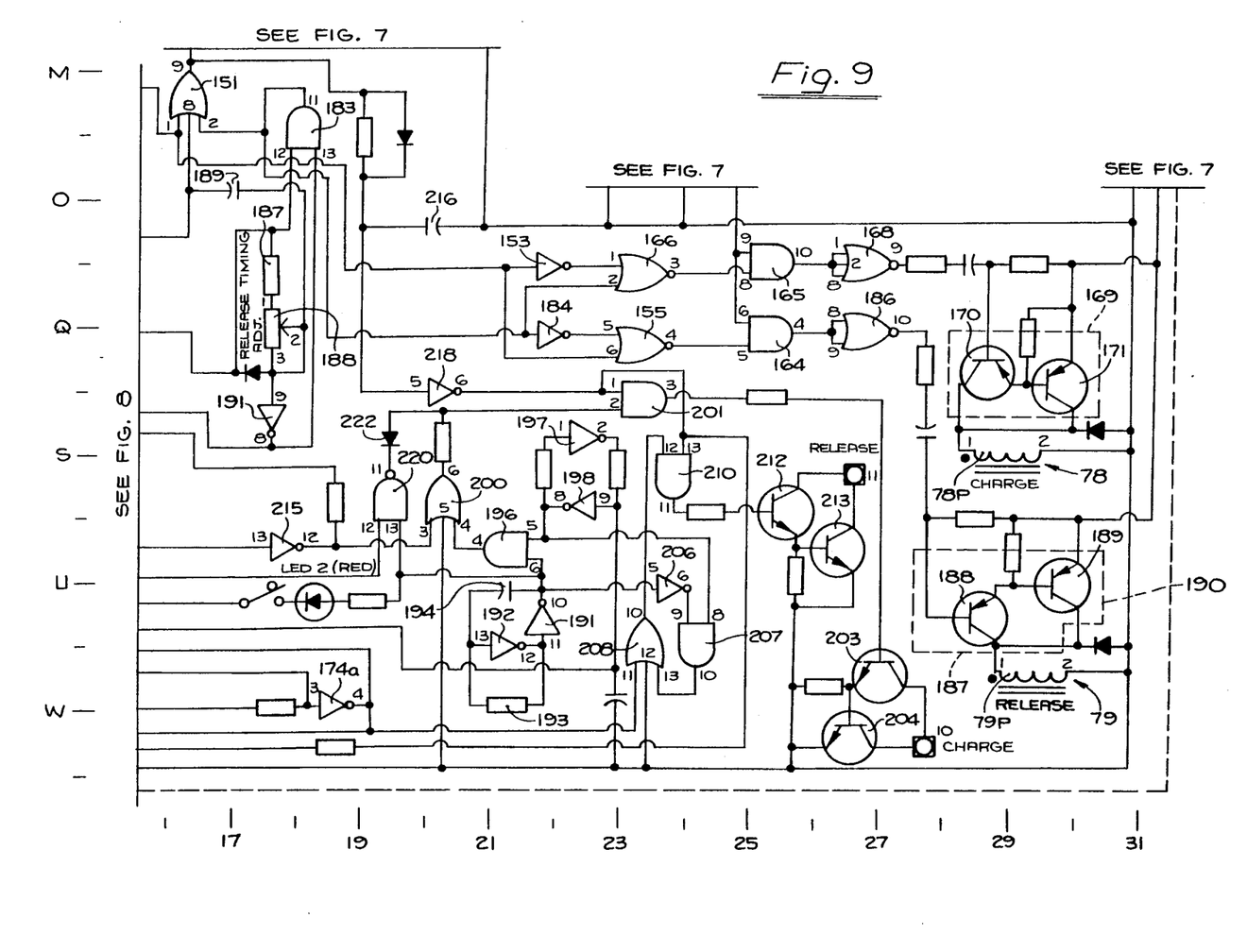
FIG. 9 is a portion of the main electrical circuit.

Returning from the rectifiers 58, 59, 60 is a common line 70 which leads to the return line 56. In this line, 70/56, is a current sensing transformer 72 for providing a reduced voltage source for certain portions of the control circuit 50 (FIG. 8). Leading, from the output of the rectifiers 58, 59, 60 are lines 74, 76 (FIG. 5) which lead to the chuck 38, identified above. Connected in the lines 74, 76 are transformers 78, 79 for controlling the direction of the DC through the chuck. The primaries of these transformers are located in FIG. 9, right (T-29 and W-29).

Figure 19:
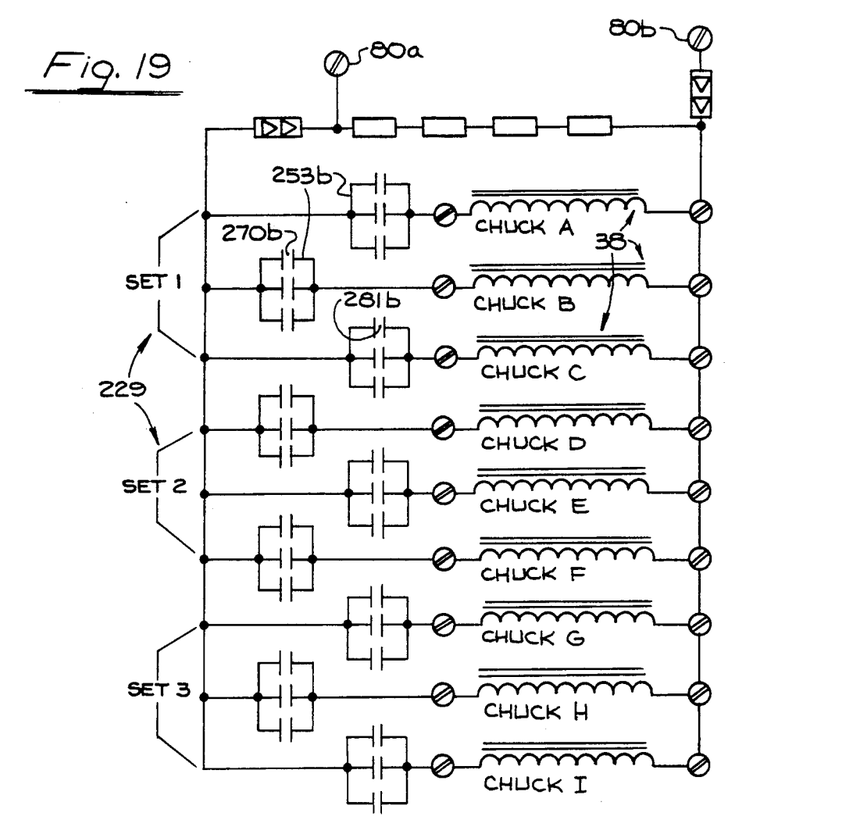
FIG. 19 shows a multi-chuck arrangement.

Terminals 80a, 80b (FIG. 5) are; shown at the connection of the chuck in the circuit, these terminals occurring also in FIG. 19 to which the multi-chuck component is connected. Associated with the transformers are SCRs 81, 82 respectively for controlling the direction of the DC through the chuck. At the bottom of FIG. 8, are certain legends, CHARGE, RELEASE, VARIABLE HOLD POWER, which will be referred to again hereinbelow in the steps of controlling the chuck, through the transformers 78, 79.

In the operation of the apparatus and control of the chuck, various phases are involved, which are referred to herein as modes. Charging the chuck for holding the workpiece is identified as the CHARGE mode. After the working operation (grinding) is performed on the workpiece, a discharging step is performed, to discharge the chuck, which releases the workpiece, and this is identified as the RELEASE mode. Additionally, at times, less than a full charge is imposed on the chuck for holding, and this is referred to as the VARIABLE mode. The following includes discussion of the operation, including the modes mentioned, for both the single chuck, and the multi-chucks.

SINGLE CHUCK

CHARGE Mode

Figure 18:
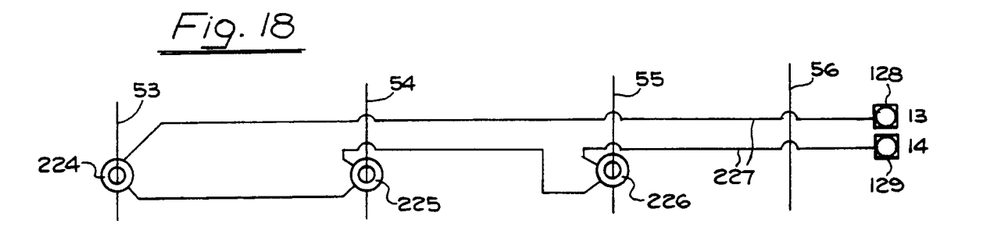
FIG. 18 shows an alternate form of current sensing component.

The power circuit 48 of FIG. 5 is substantially identical in the case of the single chuck and the multi-chucks; in the latter case (FIG. 19) the multi-chucks are connected to the terminals 80a, 80b, in replacement of the single chuck. Also, in the case of the multi-chucks, the current sensing arrangement of FIG. 18 is preferably used instead of the component 72 (FIG. 5).

Referring to the control circuit 50, and specifically to FIG. 6 thereof, a power supply is shown at 83 (A-4) and includes a transformer 86 connected, through terminals, 84a, 84a, with the main power source 52. A RED signal light 85 is connected across the primary 86P. This transformer supplies an output voltage of 15 VAC, through terminals #5 and #6, which is rectified by a rectifier 88 and limited to 12 V by a voltage regulator 90. This 12 VDC power supply, supplies the power to the entire control circuit. Other components and elements are directly related to this power supply, various ones of which are referred to hereinbelow.

The control circuit includes an SCR trigger circuit 87 (G-4) which includes control transformers 92, 93, 94, connected respectively with the lines 53, 54, 55 in the main power supply (FIG. 5) and returning to the neutral line 56. Relative to the transformers 92, 93, 94, the SCRs 66, 67, 68 are connected in the lines 53, 54, 55 downstream, so that the transformers are actuated directly by the main source. These transformers are connected in three line components 87a, 87a, 87a respectively, which are related to the three phases of the AC, and all are substantially identical in make-up and operation and in the following description, a description of only one, 87a/92 will be made, for convenience, it being understood that the operation will be the same for the other lines and corresponding phases of the AC.

The current sensing transformer 72 (FIG. 5) produces current in the secondary 72s which leads to a rectifier 95 (O-4) (FIG. 8) for providing DC for controlling the grinder through controls incorporated in the grinder itself.

Figure 10:
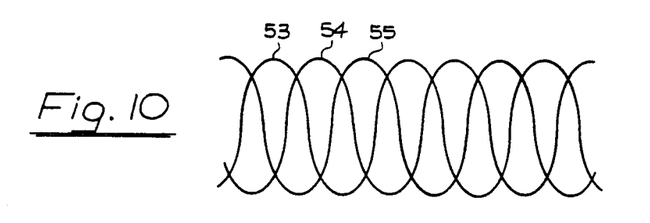
FIG. 10 shows the displacement of the phases of the 3-phase source.
Figure 11:
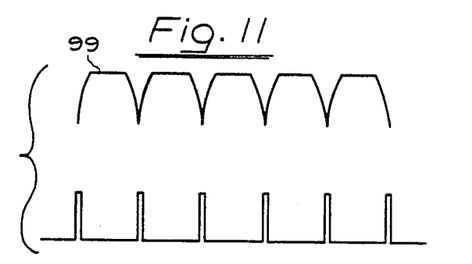
FIG. 11 indicates the limiting of the DC outputs applied to the control circuit.
Figure 12:
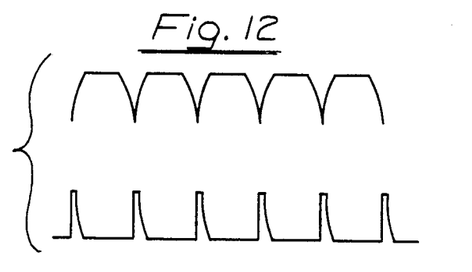
FIG. 12 is a view similar to FIG. 11 of another step in the control functions of the control circuit.
Figure 13:
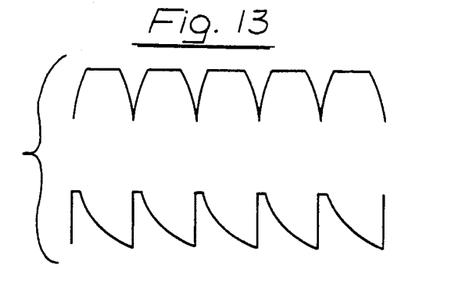
FIG. 13 is a view similar to FIGS. 11-12 of another step in the functions of the control circuit.
Figure 14:
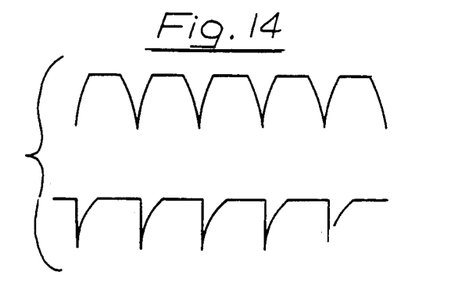
FIG. 14 is a view similar to FIGS. 11-13, of another step in the functions of the control circuit.
Figure 15:
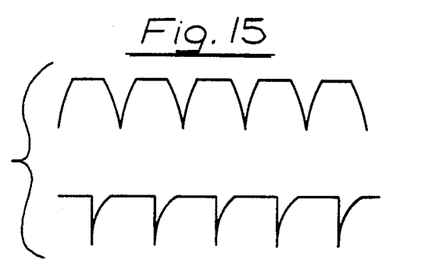
FIG. 15 is a view similar to FIGS. 11-14 of another step in the functions of the control circuit.
Figure 16:
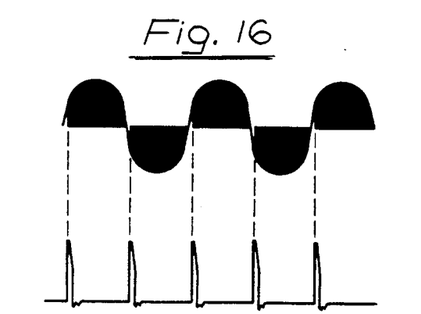
FIG. 16 is a view similar to FIGS. 11-15 of another element in the control circuit.
Figure 17:
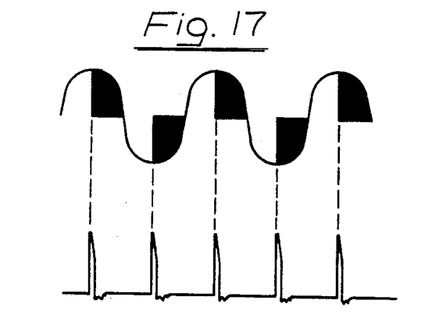
FIG. 17 is a view similar to FIGS. 11-16 of another element in the control circuit.

The transformers 92, 93, 94 provide the 3 phases necessary for producing the trigger pulses for the SCRs 66, 67, 68 (FIG. 5) of each AC line phase, the sine waves to the transformers being 120° out of phase with each other (FIG. 10). The outputs of the secondaries 92s, 93s, 94s are connected with rectifiers 96, 97, 98. The DC output of the rectifier 96, is clipped to 12 V by a zener diode 99, the 12 V outputs of the three rectifiers being also 120° apart. Each time the voltage across the zener diode 99 approaches the zero crossing, pin 6 of the inverter 99a goes HI (FIG. 11). The gate 100 (L-18) is thereby enabled, and the transistor 102 (L-19) turns ON at each zero crossing. This causes the capacitor 104 (L-20) to discharge. When the transistor 102 is OFF, the capacitor 104 will charge up at a fast rate through fully turned on transistor 106 (M-21). On the next zero crossing, the capacitor 104 is again quickly discharged (FIG. 12). If the transistor 106 is only partially turned ON, the capacitor 104 will charge up at a slower rate (FIG. 13). Voltage on the capacitor 104 is monitored by the transistor 108 (M-23), and when the voltage across the capacitor rises above the reference voltage as set by the transistor 110 (K-23), the transistor 108 (M-23) will turn ON. The transistor 110 is used as a voltage reference for the transistor 108. Voltage base-emitter variations of the transistor 108 caused by temperature changes will be compensated for by voltage base-emitter variations of the transistor 110. When the transistor 108 turns ON, the transistor 112 (N-24) turns ON also, which charges up the capacitor 113 (N-25). When the transistor 112 is turned OFF again, the capacitor 113 discharges through the resistor 114 (M-24). Waveforms at the junction of the capacitor 113, resistor 116 (M-26), diode 117 (M-26) and resistor 118 (N-28) are shown at FIG. 14 (max. DC output) and FIG. 15 (50% DC output). The voltage on the capacitor 113 (N-25) is then applied to the inverters 120, 121 (L-28) which drives the Darlington circuit 122 (M-30) which includes the transistors 123, 124. This Darlington circuit is used to switch the pulse transformer at the correct phase of the AC sine wave depending on the desired output. Waveforms of voltage across the pulse transformer are shown in FIG. 16 (max. DC output) and FIG. 17 (50% DC output).

This produces the trigger pulse for the corresponding phase and line, and as mentioned before, the other trigger circuit portions for line components 87b and 87c are identical therewith, and function in the same manner, but of course with the pulses occurring at different phase angles corresponding to the particular line phases.

Figure 22:
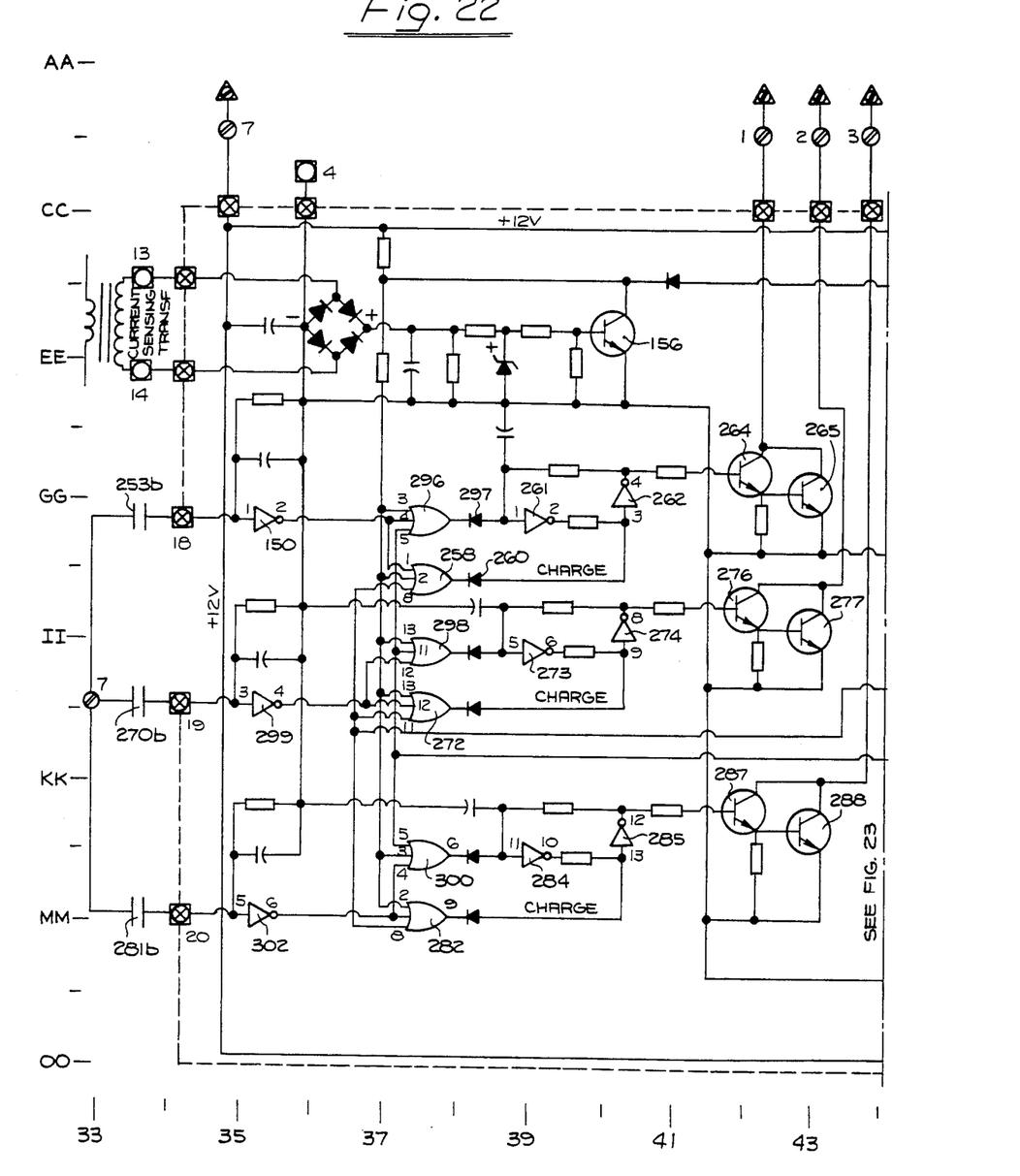
FIG. 22 is a portion of a PCB for use in the multi-chuck arrangement.
Figure 23:
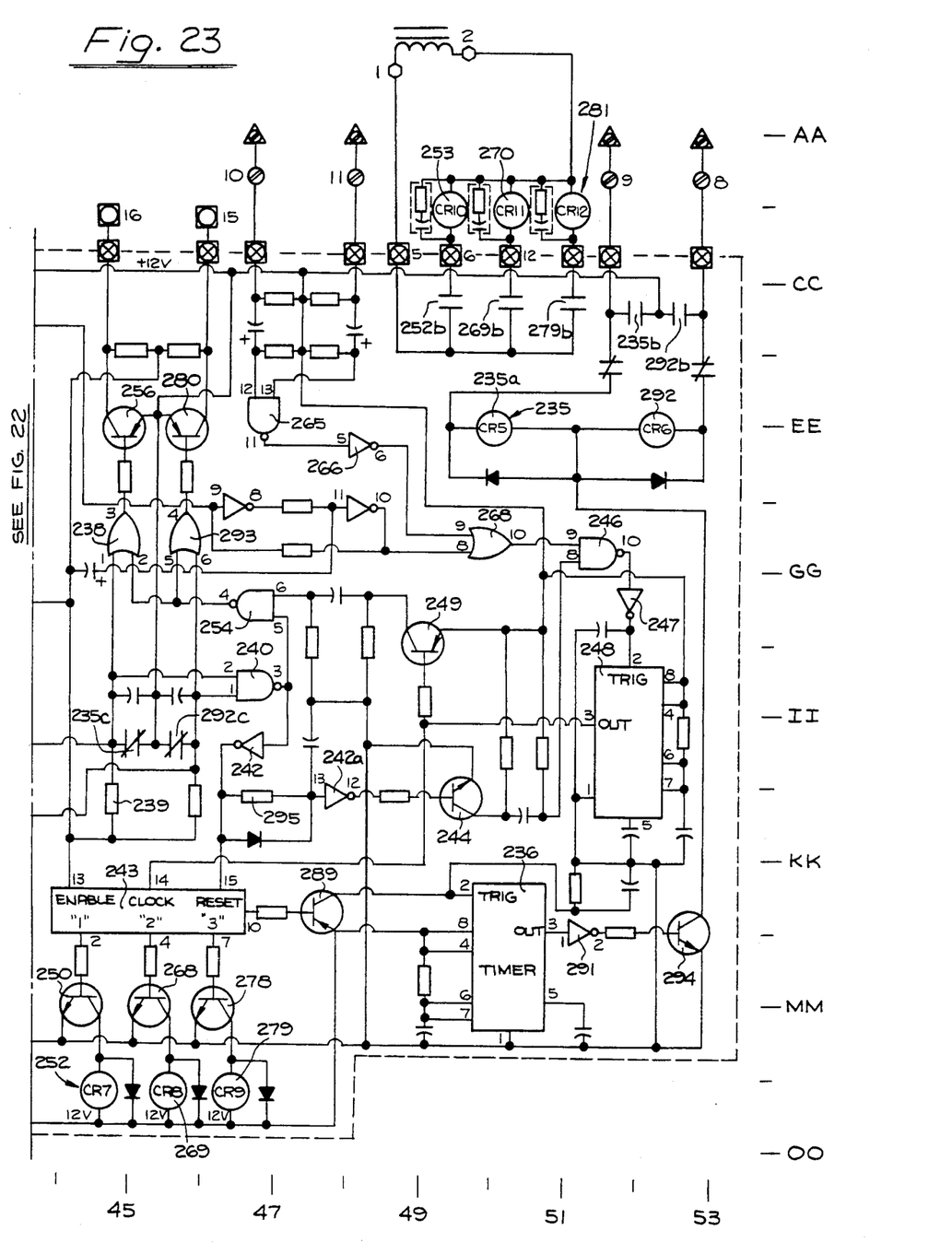
FIG. 23 is another portion of the PCB.

In the control circuit 50 of FIGS. 6-9, and the circuit of FIGS. 22, 23, it will be seen that various ones of the terminals occur in both circuits. The current sensing transformer 72 (FIG. 5) is incorporated in a current sensing circuit, including conductors 125, 125a connected to terminals #13, #14, (FIGS. 6 and 8) and leading to the rectifier 95 (O-4), identified above. The current flowing through the magnetic chuck 38 (load) (FIG. 5), and primary 72P induces a current in the secondary 72-S. The output of the rectifier 95 is applied to the non-inverting input pin 3 of the gate 126 (R-8) and a potentiometer 127 (Q-7) controls the amount of voltage at the inverting input pin 2 of the gate 126. In this circuit, the gate 126 is used as a voltage comparator, comparing the two voltages present at pins 2 and 3, and then produces an output at pin 6 accordingly. As an example, if there is sufficient current flowing to the chuck 38 (FIG. 5), the voltage at pin 3 of the gate 126 will exceed that at pin 2 thereof and will produce a HI output at the pin 6. This output is then applied to the inverter 128 (R-7) at pin 5. As a result, pin 6 of this inverter becomes LO and passes through the diode 129 (R-7) since it is forward biased. Accordingly, pin 3 of the gate 130 (Q-5) becomes LO, and pin 4 of that gate goes HI. This high output passes through the resistor 132 (S-4) and through pin 11 of the inverter 133 (R-3). Pin 10 of the inverter 133 goes LO and turns ON the transistor 134 (R-6). The transistor 136 (V-6) is presently ON, and as a result thereof, 12 VDC passes through the transistors and energizes the current sensing relay 138 (T-7). The LED 140 also turns ON and the contacts 138b, 138c (FIG. 8, lower left) are actuated. These contacts are provided as components in the grinder itself, enabling the operator or customer to connect the machine controls to stop the machine or alert the operator in the event the chuck 38 (FIG. 5) is insufficiently charged.

For the operation of the apparatus, attention is directed to the operator's control switches 140 CHARGE (Z-7), 142 RELEASE (Z-9). Directly associated with the charging of the chuck is a potentiometer 144 (Z-14) for predetermining the amount of charge placed on the chuck. Also associated with these control switches are signal lights 145 GREEN (Z-10) and 146 RED (Z-12). Attention is also directed to the transformers identified above, 78 CHARGE (T-29) and 79 RELEASE (W-29).

In the operation of the apparatus, upon placing the workpiece on the chuck 38, the chuck is charged or energized, and after the grinding operation is completed, the chuck is de-energized or de-magnetized for releasing the workpiece from the chuck. Hence,,as noted above, for convenience, the term RELEASE is used for de-magnetizing the chuck and, of course, the workpiece. In the regular use of the grinder, various workpieces, or loads are encountered, and it is desired at various times to charge the chuck at full voltage value, and at other times at a value less than full. For this purpose, the potentiometer 144 (Z-14, see above) is utilized, and, according to the setting thereof, the charge imposed on the chuck is correspondingly adjusted.

In the step of charging the chuck, in the CHARGE mode, the CHARGE switch 140 (Z-7) is closed, which energizes the relay 147 (W-7), and 12 VDC is applied to the flip-flop circuit including the gates 148, 149 (O-13) whereby pin 10 of the gate 149 and pin 2 of the gate 150 (N-15) go HI. Pin 3 of the gate 150, pin 1 of the gate 151 (M-16), pin 1 of gate 153 (Q-22), and pin 6 of gate 155 (R-23) all go HI. At the zero crossings, the outputs of these gates go LO, turning ON the transistors 156 (G-14), 158 (K-15), 102 (L-20). This is the initial stage of trigger pulses, in controlling the power circuit of FIG. 5. In this step, the power SCRs 66, 67, 68 (FIG. 5) are triggered to ON condition and current then flows through the rectifiers 58, 59, 60. The DC outputs of these rectifiers are parallel and imposed on the chuck 38 (FIG. 5, bottom).

Referring again to the trigger circuit (FIGS. 6, 7), three trigger signals are applied to the gate 160 (O-27) at pins 11, 12, 13. The signals are then inverted through the gate 162 (O-26), and the output is applied to the gates 164, 165 (Q-25).

When pin 3 of the gate 150 (N-15) goes HI, pin 1 of the gate 153 (Q-22) also goes HI. Pin 2 of the gate 153 and pin 1 of the gate 166 (Q-23) go LO. This makes pin 3 of the gate 166 go HI. Gate 165 (Q-25) is then enabled, allowing the trigger pulses to pass through. The trigger pulses are then inverted by the gate 168 (Q-27) and applied to the Darlington circuit 169 (R-31), including transistors 170, 171. The output of this Darlington circuit drives the pulse transformer 78 CHARGE (FIG. 5, bottom) identified above, the secondaries of which energize the SCRs 81 (FIG. 5). The DC outputs of the rectifiers 58, 59, 60 pass through these SCRs, the voltage thereby being applied to the electric permanent magnet chuck, which is thereby charged.

When the CHARGE switch 140 (Z-7) is closed, pin 10 of the gate 149 (Q-14) goes HI, and by means of a resistor 172 (Q-13) and the potentiometer 172a (Q-13), the capacitor 172b (Q-15) is charged. The voltage across this capacitor increases and is applied to pin 13 of the gate 173' (O-15) Upon the voltage of the capacitor 172b reaching the threshold of he gate 173', pin 12 of that gate goes LO. This causes pin 3 of the gate 150 (N-15) and pin 1 of the gate 151 (M-17) to go LO. Pin 9 of the gate 151 also goes LO. The gates 173 (H-13), 173a (J-13), and 100 (L-17), are all disabled, their outputs becoming HI. As a result, the transistors 156 (G-14), 158 (J 15), 102 (L-19), are all non-conducting, and therefore no trigger pulses are developed. The power SCRs 81 (FIG. 5) are all in their OFF state, and the DC voltage to the chuck 38 is cut off. The potentiometer 172a (Q-13) is adjusted to provide approximately 1 second of CHARGING time.

The chuck 38 as thus charged remains in charged condition because of its permanent magnet nature, and it will remain so until controllably de-magnetized, in the RELEASE step, as described hereinbelow, i.e., the circuit becomes inactive, or in non-charging condition indefinitely, and it remains in such condition as long as desired, i.e., throughout the grinding operation performed on the workpiece. After that operation, the circuit is again activated for providing the de-magnetizing, or releasing, step.

As referred to above, the charge on the chuck is to have a certain predetermined selected value, and for this purpose the potentiometer 144 (Z-14) referred to above is utilized. In the CHARGE mode, the relay 147 (X-7) is energized, and through the normally open contacts 147b (O-11), 12 VDC is applied to the diode 174 (W-13), and since this diode is forward biased, the 12 VDC passes through pin 3 of the gate 174a (W-19) and makes that pin go HI. Pin 4 of this gate becomes LO, which, by means of diode 168 (W-9) and resistor 169 (W-7), turns ON the transistor 136 (V-6). In this step, the relay 170 (U-7) is energized. The potentiometer 144 (Z-14) is connected across the terminals #8, #9 (Y-14). When the potentiometer 144 is in advanced position, it acts as a short circuit between those terminals. The voltage set by the potentiometer 175 (V-7) causes current to pass through the N/O contact 170b (U-9) through the resistor 171 (U-9), through the terminal #9 (T-9 and Y-14) and terminal #8 (Y-15), then through the other N/O contact 170c (U-10) and then to the bases of the transistors 175 (G-17), 176 (I-18), 106 (M-21). These transistors are then conducting at maximum rate and produce quick charging of the capacitors 177 (G-15), 178 (J-16) and 104 (L-20), and, as explained above, these trigger the power SCRs 81, 66, 67 and 68 (FIG. 5) in each half cycle of the AC sine waves. These give maximum DC output to the magnetic chuck. In the opposite situation, the potentiometer 144 (Z-14) is fully retracted and accordingly the capacitors 177 (G-15), 178 (J-16), 104 (L-20) charge at a slower rate. The power SCRs (FIG. 5) are triggered during the latter portion of each half-cycle of the sine waves, which result in a minimum DC voltage applied to the chuck.

RELEASE Mode

Upon the completion of the operation on the workpiece, i.e., grinding, it is desired to de-magnetize the chuck and workpiece, to release the workpiece. In this mode, the RELEASE. switch 142 (Z-9) is actuated, which energizes the relay 180 (W-8), and through the N/O contacts 180b (Q-11), 12 VDC is applied to pin 9 of the gate 182 (R-13). Pin 8 of that gate goes LO, as also does pin 13 of the gate 181 (R-15); pin 12 of this gate goes HI as also does pin 12 of the gate 183 (O-18). Pin 11 of the gate 183 goes HI, and pin 9 of the gate 151 (L-17)goes HI. This enables the gates 173 (G-13), 173a (J-13), 100 (L-17). At each zero crossing, the transistors 156 (G-14), 158 (L-15), 102 (L-19) turn ON, as referred to above in connection with the triggering action and the power SCRs at 81 (FIG. 5, bottom) are turned ON.

In this mode, with the N/O contacts 180b (Q-11) closed, pin 9 of the gate 182 (R-13) goes HI, and pin 8 of that gate goes LO, and pin 13 of the gate 181 (R-15) goes LO. Pin 12 of the gate 181 and pin 12 of the gate 183 (O-18) go HI. Pin 11 of the gate 183 and pin 3 of the gate 184 (Q-22) go HI. Pin 4 of the gate 184 (R-22) and pin 5 of the gate 155 (R-23) go LO, and pin 4 of gate 155 goes HI. This enables the gate 164 (R-25). The trigger pulses appear at pin 4 of the gate 164 and are inverted by the gate 186 (R-27) at pin 10 thereof.

During each trigger pulse, the transistors 188 and 189, in the Darlington unit 190 (V-30), in turn, drive the pulse transformer 79 (W-29). The secondaries of this transformer (FIG. 5, bottom) trigger the release SCRs 82. Thereupon, DC voltage of opposite polarity relative to that in the CHARGE mode is now applied to the magnetic chuck 38, and accordingly the workpiece is released from the chuck.

When the RELEASE switch 142 (Z-9) is closed, and the relay 180 (X-8) is energized, by means of the N/O contacts 180b (Q-11), pin 9 of the gate 182 (R-13) goes HI. Pin 8 of this gate, and pin 13 of the gate 181 (R-15) go LO, and pin 12 of the latter gate goes HI. Through the resistor 187 (Q-17) and the potentiometer 188 (R-17), the capacitor 189 (0-17) is charged. When the voltage in the capacitor 189 reaches the threshold level of the inverter 191 (S-17), pin 9 of this gate goes high. Also, pin 8 of this gate goes LO, as does pin 13 of the gate 183 (O-18). As a result, the outputs of the gates 173 (G-13), 173a (J-13), and 100 (L-17) are all HI. The transistors 156 (F-15), 158 (J-15), and 102 (L-20) are all reverse biased, and no further trigger pulses are developed. The power SCRs 82 (FIG. 5) are turned off, and the voltage, referred to as RELEASE voltage, to the chuck is terminated. In this step, the potentiometer 188 (Q-17) is adjusted to 1-second RELEASE timing.

An astable oscillator circuit is provided, including the gates 191 (V-22) and 192 (W-21), resistor 193 (X-22), and capacitor 194 (V-22). The output at pin 10 of the gate 191 continuously changes state (oscillates) as long as there is power to the circuit. When the AC power is first applied to the unit, pin 5 of the gate 196 (U-21) is HI by means of the flip-flop consisting of the gates 197 (S-23) and 198 (T-23). Each time the oscillator output, pin 196 of the inverter 191 (W-22), goes HI, pin 4 of the gate 196 (U-21) also goes HI. Pin 6 of the gate 200 (T-20) goes HI, as does also pin 2 of the gate 201 (S-23). Pin 3 of the latter gate goes HI, which applies a forward bias to the transistors 203 (W-27), 204 (X-27), as a result of which each time the oscillator output goes HI, the CHARGE lamp 145 (Z-10) turns ON. When the oscillator output goes LO, the CHARGE lamp turns OFF. When the oscillator output is LO, pin 6 of the inverter gate 206 (V-24) goes HI, and vice-versa. Pin 10 of the gate 207 (W-24) also goes HI, along with pin 10 of the gate 208 (W-23). This makes pin 11 of the gate 210 (T-24) go HI, turning ON the RELEASE transistors 212, 213 (U-26). Then the RELEASE lamp 146 (Z-11) turns ON. As a result, the CHARGE and RELEASE lamps alternately turn ON and OFF. This effect notifies the operator that no mode or phase has been selected yet, and the magnetic chuck 38 could be in either condition, i.e., magnetized or de-magnetized, depending on its previous condition prior to turning off the AC power.

When the operator closes the switch, e.g., the CHARGE switch 140 (Z-7), the relay 147 (X-7) is actuated, and through contacts 147b (O-11) circuit is made through the diode 210 (V-13), and pin 9 of the gate 198 (U-22) goes HI. Pin 8 of this gate goes LO, as does pin 5 of gate 196 (U-21) and pin 8 of the gate 207 (W-24). Pin 4 of the gate 196 and pin 10 of the gate 207 stay LO, regardless what the oscillator does. Accordingly, both lamps, 145 (Z-10) and 146 (Z-12), are turned OFF.

Turning back to the step where the relay 147 (W-7) is energized, acting through the diode 212 (T-10), pin 11 of the gate 214 (U-14) goes HI. Pin 10 of this gate is LO, as is pin 13 of the gate 215 (U-18). Pin 12 of the latter gate goes HI. The output is applied to pin 3 of the gate 200 (U-20), which causes pin 6 of this gate to go HI. The gate 201 (S-23) is enabled. When pin 9 of the gate 151 (M-17) goes HI, as was previously explained in the CHARGE mode, the capacitor 216 (P-20) is charged, and upon reaching the threshold of pin 5 of the gate 218 (S-20), pin 6 of this latter gate goes LO. When pin 9 of the gate 151 (M-17) goes LO again, after about 1 second, pin 5 of the gate 218 (S-20) goes LO. Pin 6 of this gate, and pin 1 of the gate 201 (S-23), go HI. The output of this latter gate at pin 3 goes HI and turns ON the CHARGE transistors 203, 204 (W-27). Accordingly, the CHARGE lamp 145 (Z-10) is turned ON. In a situation where the current sensing circuit was not triggered, e.g., due to insufficient load current through the transformer 72 (FIG. 5), pin 13 of the gate 218 (S-20) will go LO. Pin 11 of this gate and pin 12 of the gate 220 (U-19), go HI, and the latter gate is now enabled. It will be noted that the oscillator output is also connected to pin 13 of the gate 220. Each time that the oscillator output goes HI, pin 11 of the latter gate goes LO. Through the diode 222 (S-19), pin 2 of the gate 201 (S-23) also goes LO, which causes pin 3 of the latter gate to go LO. The CHARGE transistors 203, 204 (W-27) are reverse biased, which turns OFF the CHARGE lamp 145 (Z-10), and, as a result, during undercurrent conditions, the CHARGE lamp flashes to alert the operator.

FIG. 18 shows a current sensing arrangement, forming an alternative to the transformer 72 (FIG. 5) and related elements. In the present instance (FIG. 18), the input lines 53, 54, 55 and the neutral line 56 are shown, and transformers 224, 225, 226 are operably associated with the input lines. These transformers have, for example, four turns each, and a sub-circuit 227 containing the transformers are connected with the terminals #13, #14, 128 (K-2), 129 (O-2).

MULTI-CHUCK

CHARGE Mode

While in many cases a single chuck 38 (FIG. 5 is sufficient for holding the workpiece to be ground, there are many instances in which large workpieces are to be held, and attention is directed now to the phase of the invention relating to multiple chucks used for such large workpieces. FIG. 19 shows an arrangement, indicated in its entirety at 229, containing a plurality of chucks, in this case nine. The nine chucks are arranged in three sets of three chucks each, the sets being numbered 1, 2, 3, and the individual chucks A, B, etc., serially through the sets. The chucks are numbered 38, these being identical with the single chuck of FIG. 5. FIGS. 2 and 3 are top views of a table of a grinder, the former including a single chuck and the latter a plurality of chucks, e.g., nine. They may be arranged in the table in any suitable manner according to the sizes and dimensions of the workpieces to be held, this arrangement being established from a practical standpoint. The circuits of FIGS. 21-23 include the controls that are specially adapted to the multiple chucks, these being utilized with the main control circuit of FIGS. 6-9, and the power circuit of FIG. 5.

Figure 20:
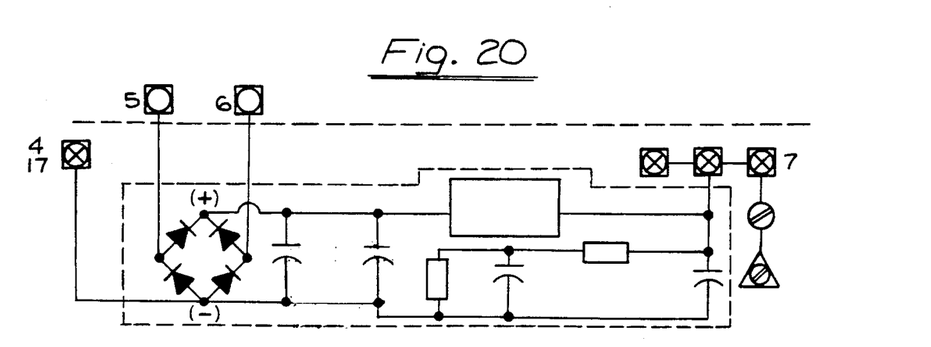
FIG. 20 shows a component used in the multi-chuck circuit.

FIG. 20 shows another form of power supply, including components mounted on a cambion board, this being similar to the 12 V source shown in FIG. 6 (C-5). FIG. 20 includes the terminals #5, #6 (see B-5, E-5).

Figure 21:
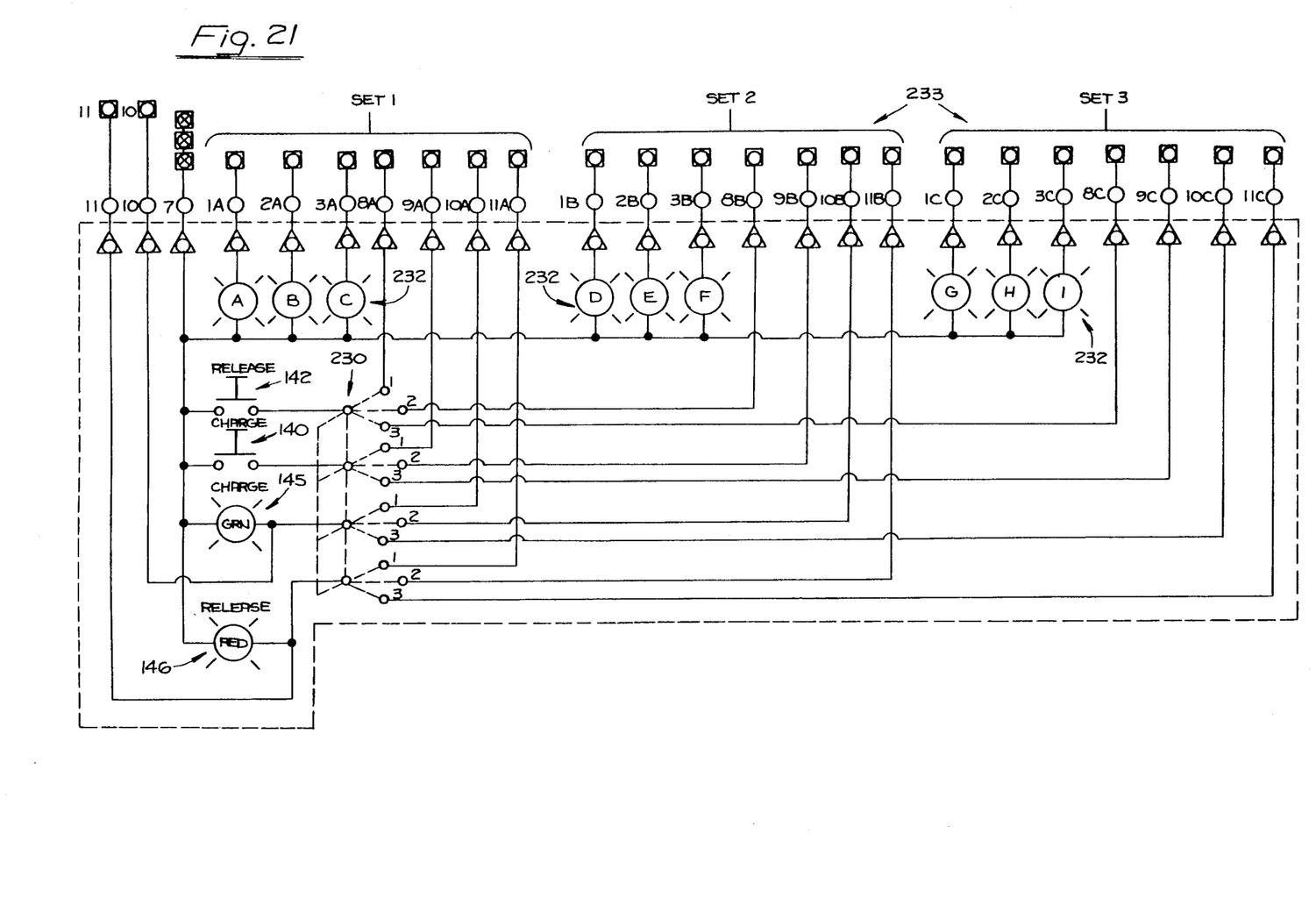
FIG. 21 is a circuit component for selecting individual chucks in the multi-chuck arrangement.

Reference is made to the electrical circuit of FIG. 21, which includes various ones of the elements of the other circuits. For example, the RELEASE switch 142 (Z-9) is shown as is the CHARGE switch 140 (Z-7), as are the CHARGE signal light 145, and RELEASE signal light 146 (Z-10). Also included is a 4-pole, 3-throw switch 230, movable into positions corresponding to the sets of chucks of FIG. 19. FIG. 21 includes signal lights 232, corresponding to the individual chucks. Various terminals are indicated as a group at 233 at the top of FIG. 21, having individual terminal numbers corresponding to other terminals in the other circuits to which they are related.

To operate the apparatus, the operator pushes the CHARGE switch 140 (Z-7), which applies positive voltage from terminal #7 to terminal #9 (see Y-5 and Y-14). Terminal #9 is also found at (CC-52) and at this point transistor 294 (LL-53) is conducting, and in response to the CHARGE switch being closed, relay 235 (EE-50) is energized, and is latched by means of N/O contacts 235b (DD-52). The transistor 294 (LL-53) (FIG. 23) is always ON except when the timer 236 (LL-50) is timing out. The N/C contacts 235c (II-45) (FIG. 23) open, and causing pin 1 of the gate 238 (GG-45) to go LO, through the resistor 239 (JJ-45). At the same time, pin 2 of the gate 240 (II-47) is also LO, and pin 3 of this gate goes HI, and pin 12 of gate 242 (II-47) goes LO. This allows the counter 243 (LL-45) to start counting. It is to be noted that pin 13 of the gate 242a (JJ-47) (FIG. 23) also goes LO, and pin 12 of this gate goes HI, and thus the transistor 244 (JJ-49) turns ON. Thereupon, pin 8 of gate 246 (GG-52) goes LO, causing pin 10 of this gate to go HI. Pin 4 of the inverter 247 (GG-52) goes LO, which triggers the timer 248 at pin 2 thereof. The output of this timer at pin 3 goes HI and provides a clock signal for the counter 243 (LL-45) at pin 14 thereof. Thereupon, the transistor 249 (HH-49) turns OFF. Pin 2 of the counter 243 (LL-45) goes HI, which turns on the transistor 250 (MM-45), thereby energizing the relay 252 (OO-44). Upon closure of the N/O contacts 252b (CC-49), the relay 253 (BB-49) is energized, and it connects chuck A into the circuit through its N/O contacts 253b. The timer 248 (II-52) is set to time out after a few seconds, and then its pin 3 goes LO.

It will be noted that in the case of each of the chucks (FIG. 19) there is a group of three N/O contacts to provide greater carrying capacity for each chuck. At this point the transistor 249 (HH-49) is ON, and for a brief period pin 6 of the gate 254 (HH-47) goes HI, and pin 4 of this gate goes LO, as does pin 2 of the gate 238 (GG-45). This causes pin 3 of the latter gate to go LO, which turns ON the transistor 256 (EE-45). This applies 12 V to the terminal #16 (BB-46) and energizes the relay 147 (W-7) in FIG. 8. It will be noted that this is the same sequence of events as occurred when the CHARGE switch (Z-7) of FIG. 8 is closed. Thus, DC power is applied to the corresponding chuck A (FIG. 19).

When the proper amount of current passes through the current transformers 224, 225, 226 (FIG. 18), this voltage is applied at terminals 13, 14 (K-1, O-1, DD-34, EE-34). It is then filtered, regulated, and applied to the base of the transistor 156 (EE-41) also referred to above (G-14), which turns on that transistor. Pin 2 of the gate 258 (HH-38) goes LO, and pin 9 of this gate also goes LO. Acting through the diode 260, and the flip-flop circuit of the gates 261, 262 (GG-39), pin 4 of the gate 262 goes HI, turning ON transistors 264, 265 (GG-42), which applies common negative to terminal 1 (CC-43), turning ON the chuck indicator lamp A 232 (FIG. 21, left). Upon the CHARGE lamp 145 (Z-10) turning ON, as referred to above, terminal 10 (Z-10, CC-47) goes LO. For a brief period, pin 12 of the gate 265a (EE-47) goes LO, and thereby pin 11 of this gate goes HI. This signal is then inverted by means of the inverter 266 (EE-49), which causes pin 9 of the gate 268 (GG-50) to go LO and pin 10 of this gate goes LO. This is applied to pin 9 of the gate 246 (GG-52), thus switching pin 10 of this latter gate to HI. This signal is inverted by the gate 247 (HH-52), making pin 4 of this latter gate LO. The LO signal at pin 2 of the timer 248 (II-52) triggers this timer again. Pin 3 of this timer goes HI, which allows the counter 243 (LL-45) to advance one count. Thereby, pin 2 of this counter goes LO, and at the same time pin 4 of this counter goes HI. When pin 2 of the counter goes LO, the transistor 250 (MM-44) is turned OFF, thus de-energizing the relay 252 (NN-45). The N/O contacts 252b (CC-49) open, which also de-energizes the relay 253 (BB-50). Accordingly, chuck A is disconnected from the circuit through the N/O contacts 253b (GG-33). At the same time, when pin 4 of the timer 243 (LL-45) goes HI, the transistor 268 (MM-45) is turned on. Thereby, relay 269 (MM-45) is energized, and through its N/O contacts 269b (DD-50), the relay 270 (BB-50) is also energized. Accordingly, chuck B (FIG. 19) is now connected in circuit by means of the N/O contacts 270b (JJ-33). When the timer 248 (II-52) times out, its pin 3 goes LO again, and the transistor 249 (HH-49) turns ON. For a brief period, pin 6 of the gate 254 (GG-47) goes HI, and pin 4 of this gate goes LO, and also pin 3 of the gate 238 (GG-45) goes LO. Accordingly, the transistor 256 (EE-45) turns ON, and the relay 147 (X-7) is energized. Thereby, DC power is applied to chuck B.

Through the gate 272 (JJ-38) and the flip-flop circuit gates 273, 274 (II-39), the transistors 276, 277 (II-43) turn ON. Also the chuck B indicator lamp (FIG. 21, left turns ON through terminal #2. Upon the terminal #10 (DD-47) going LO, the timer 248 (II-52) is triggered again, through the gates 265 (EE-47), 266 (EE-48), 268 (GG-50), 246 (GG-52), and 247 (GG-52). At this time, pin 3 of the timer 248 (II-52) goes HI, and the counter 243 (LL-45) advances one count, again. At this point, pin 4 of the counter goes LO, turning off the transistor 268 (MM-13). Consequently, the relay 269 (MM-13) is de-energized, which also deenergizes the relay 270 (2B-50), and chuck B is removed from the circuit.

Pin 7 of the counter 243 (LL-45) is now HI, and the transistor 278 (MM-47) is turned ON, energizing the relay 279 (NN-14). Accordingly, the relay 281 (BB-51) is energized, through the N/O contacts 279b (CC-51) and chuck C is connected in the circuit, through the N/O contacts 281b (MM-33). When the timer 248 (II-52) times out, the transistor 249 (HH-49) turns ON, and through the gate 254 (HH-47) and the gate 238 (EE-45), the transistor 256 (EE-45) turns ON once again. Consequently, the relay 147 (W-7) is energized, and DC power is applied to chuck C (FIG. 22). Through the gate 282 (MM-37), the flip-flop circuit of gates 284, 285 (LL-39) turn ON the transistors 287, 288 (KK-42). At this point, the chuck C indicator lamp (FIG. 21, upper left) turns ON, through terminal #3. Upon the terminal #10 (CC-47) becoming LO the timer 248 (II-52) is triggered once again. The counter 243 (LL-45) advances to position 4, pin 7 of the counter goes LO, and the transistor 278 (GG-45) turns OFF, and the relay 279 (NN-46) is de-energized. Also the relay 281 (BB-51) is de-energized, thus disconnecting chuck C from the circuit. Pin 10 of the counter 243 (LL-45) goes HI and turns OFF the transistor 289 (LL-48), and pin 2 of the timer 236 (LL-50) goes LO, thus triggering the timer. Pin 3 of the timer goes HI, and through the inverter 291 turns OFF the transistor 294 (LL-53) (FIG. 23). This disrupts the voltage to the coil of the relay 235 (EE-50) and deenergizes it. This relay, through its N/C contacts 235c (II-45) causes pin 1 of gate 238 (GG-45) and pin 2 of gate 240 (II-47) to go HI. Pin 3 of the gate 238 (GG-45) goes HI, thereby shutting off the transistor 256 (EE-45). Pin 3 of the gate 240 (II-47) goes LO, which causes pin 12 of gate 242 (II-47) to go HI, which allows the counter 24 (LL-45) to reset itself. The control circuitry is now ready for the next command.

RELEASE Mode

To operate the apparatus for releasing the workpiece (multi-chucks), or to operate it in the RELEASE mode, the operator actuates the RELEASE switch 142 (Z-9), and 12 V is applied to the terminal #8 FIG. 22–23 (Y-15 and AA-53) and the relay 292 (EE-53) is thereby energized and held energized by the N/O contacts 292b (CC-53). In this step, the N/C contacts 292c (II-46) open, which causes pin 6 of gate 293 (GG-46) and pin 1 of gate 240 (II-47) to go LO. This causes pin 3 of this latter gate, and pin 5 of the gate 254 (GG-47), and pin 13 of the gate 242 (II-47) to go HI. Pin 12 of this latter gate goes LO, which allows the counter 243 (LL-45) to advance each time the clock input, pin 14, goes HI. When pin 12 of the gate 242 (II-47) goes LO, this signal passes through the resistor 295 (JJ-47), and after a short delay, pin 13 of the inverter 242a (JJ-48) (FIG. 23) goes LO. Therefore pin 12 of this latter gate goes HI, which turns ON the transistor 244 (JJ-49). For an instant, pin 8 of the gate 246 (GG-51) goes LO and pin 10 of this goes HI, together with pin 3 of the gate 247 (GG-52). This causes pin 4 of the latter gate and pin 2 of the timer 248 (II-52) to go LO.

Accordingly, the timer is triggered and begins timing. Also, the transistor 249 (HH-49) turns OFF, and output pin 3 of the timer turns HI. This applies HI logic to clock input at pin 14 of the counter 243 (LL-13) and advances the counter to #1 position, whereby pin 2 of the counter goes HI and turns ON the transistor 250 (MM-44). As a result, the relay 252 (NN-45) is energized, and through its N/O contacts 252b (CC-49) it energizes the relay 253 (BB-49) and through the N/O contacts 253b (GG-33) chuck A is put in circuit.

After a few seconds, the timer 248 (II-52) times out, and its output at pin 3 goes LO. This causes the transistor 249 (HH-49) (FIG. 23) to conduct and puts HI logic to the pin 6 of the gate 254 (HH-47) and pin 4 of this gate goes LO, together with pin 5 of the gate 293 (GG-45). As a result, pin 4 of this latter gate goes LO, which turns ON the transistor 280 (EE-46) (FIG. 23). This applies 12 V to terminal #15 (CC-46), which energizes the relay 180 (Y-8). It is to be noted that this is the same result as when the RELEASE switch 142 (Z-9) is actuated, as described above in connection with the single chuck.

DC power of opposite polarity to that obtained during the CHARGE mode is now applied to chuck A. When there is proper load current, the transistor 156 (F-14, EE-41) turns ON. Pin 3 of gate 296 (GG-38) (FIG. 22) goes LO. The relay 253 (BB-49), through its N/O contacts, 253b (GG-33), pin 1 of the gate 150 (N-15, G-35) is HI. As a result, pin 2 of this gate and pin 4 of the gate 296 (GG-38) go LO. Pin 6 of this latter gate goes LO through the diode 297 (GG-39) (FIG. 22), and pin 1 of the gate 261 goes LO. Pin 2 of this latter gate and pin 3 of the gate 262 (GG-41) go HI. Therefore pin 4 of the latter gate goes LO, which turns OFF the transistors 264, 265 (II-43). This causes the chuck A indicator lamp (FIG. 21) to turn OFF. As soon as the terminal #11 (CC-49 and Y-12) turns LO, pin 13 of the gate 265 (EE-47) goes LO also. Pin 11 of this latter gate and pin 5 of the gate 266 (EE-48) go HI. Pin 6 of the gate 266 (EE-48) and pin 9 of the gate 268 (GG-50) go LO. Pin 10 of this latter gate and pin 9 of the gate 246 (GG-52) go LO. Therefore pin 10 of this latter gate and pin 3 of the gate 247 (GG-52) are HI. This signal is then inverted by the latter gate, making its pin 4 go LO. When the LO signal is applied to pin 2 of the timer 248 (II-52), it is then triggered and begins timing out. Pin 3 of this timer goes HI throughout the timing period. The transistor 249 (HH-49) turns OFF.

HI logic is applied to pin 14 of the counter 243 (LL-45), which causes the counter to advance to position #2. Accordingly, that pin 2 of the counter goes LO and the transistor 250 (MM-44) turns OFF, which de-energizes the relay 252 (NN-13). The N/O contacts of this relay 252b (CC-49) open, which in turn deenergize the relay 253 (BB-49), and thereby chuck A is removed from the circuit. At the same time, pin 4 of the counter 243 (LL-45) goes HI, and this turns ON the transistor 268 (MM-45), which energizes the relay 269 (NN-45), and through the N/O contacts 269b (CC-50) energizes the relay 270 (BB-50). This places chuck B in the circuit. As soon as the timer 248 (II-52) times out, its pin 3 goes LO. The transistor 249 (HH-49) turns on, and pin 6 of the gate 254 (GG-47) goes HI, and pin 4 of this latter gate, and pin 5 of the gate 293 (GG-46), go LO.

Pin 4 of this latter gate goes LO, which turns on the transistor 280 (EE-46) (FIG. 23). Again, 12 V is applied to terminal #15 (CC-46), which energizes the relay 180 (X-8). RELEASE voltage is therefore applied to chuck B for the predetermined setting of 1 second. With proper load current, the transistor 156 (F-14, EE-41) will turn ON. Pin 13 of the gate 298 (II-38) goes LO, and by means of the N/O contacts 270b (JJ-33) of the relay 270 (BB-50), and inverter 299 (JJ-35), pin 12 of the gate 298 (II-37) goes LO also. Pin 10 of this latter gate goes LO, and by means of flip-flop circuit, the following are turned OFF: gate 273 (II-39), gate 274 (II-41), transistor 276 (II-42), transistor 277 (II-43) (FIG. 22). This also turns OFF the chuck B indicator lamp (FIG. 21).

Upon the terminal #11 (CC-48) going LO, pin 9 of the gate 265 (EE-47) goes HI, and through the gates 266 (EE-49), 268 (GG-50), 246 (GG-52), 247 (GG-52), pin 2 of the timer 248 (II-52) goes LO, and that timer is triggered once again. Pin 3 of this timer goes HI, and the transistor 249 (HH-49) turns OFF, and the counter 243 (LL-45) advances once more. Pin 4 of this counter goes LO, and the transistor 268 (MM-45) turns OFF. Accordingly, the relays 269 (NN-13) and 270 (BB-50) are de-energized, and chuck B is removed from the circuit.

Pin 7 of the counter 243 (LL-45) goes HI, and the transistor 278 (MM-46) turns ON, which energizes the relay 279 (NN-46) and the relay 281 (BB-51). Accordingly, chuck C is now put in circuit. After the timer 248 (II-52) times out, the transistor 249 (HH-49) turns ON, and through the gates 254 (GG-47) and 293 (GG-46), the transistor 280 (EE-46) (FIG. 23) is turned ON. Accordingly, through terminal #15 (CC-46 and Y-8), the relay 180 (W-7) (FIG. 8) is energized. As a result, RELEASE voltage is applied to chuck C for the predetermined time interval of 1 second.

When sufficient load current is developed, the transistor 156 (G-15, EE-41) turns ON. Pin 3 of the gate 300 (LL-37) goes LO, and by means of the relay 2BI (BB-51), the N/O contacts thereof 281b (MM-33) and the inverter 302 (MM-35) (FIG. 22), pin 4 of the gate 300 (LL-37) goes LO. As a result, pin 2 of this latter gate goes LO, and by means of the flip-flop circuit of the gates 284, 285 (LL-39), the transistors 287, 288 (KK-43) are turned OFF. The chuck C indicator lamp (FIG. 21) also turns OFF. When terminal #11 (CC-48) goes LO, the RELEASE lamp 146 (Z-12) turns ON. The timer 248 (II-52) is triggered once again through the gates 265 (GG-44), 266 (FF-48), 268 (GG-50), 246 (GG-52), and 247 (GG-52). Pin 3 of the timer 248 (LL-52) goes HI, and the counter 243 (LL-45) is advanced once again. Pin 7 of the counter goes LO, and the transistor 278 is turned OFF. The relays 279 (NN-47) and 281 (BB-51) are de-energized, and chuck C is removed from the circuit. At the same time, pin 10 of the counter 243 (LL-45) goes HI. This turns OFF the transistor 289 (LL-48). LO logic is applied to pin 2 of the timer 236 (LL-50), which triggers it, and it begins timing out. When the output pin 3 of this timer goes HI, the transistor 294 (LL-53) (FIG. 23) shuts OFF, and the relay 292 (EE-53) is de-energized, and the N/C contacts 292c (II-46) close, and pin 3 of the gate 240 (II-47) goes LO, and through the inverter 242 (II-47), pin 15 of the counter 243 (LL-45) goes HI. This resets the counter. The control circuitry is now ready for the next command.

The pulse transformers 62, 63, 64 effect the imposition of a pulse on the corresponding SCRs in the respective phases, and the greater the output voltage and the number of pulses, the higher will be the saturation of the gates and turn them on for longer periods.

What is claimed is:

1. Apparatus for charging, demagging, and controlling, and electric permanent magnet chuck, including circuitry connected with a main 3-phase 4-line AC electric source having three power lines and a neutral line, the circuitry including a power circuit and a control circuit, the power circuit including three input lines interconnected between respective power lines and the chuck, and including a return line interconnected between the chuck and the neutral line, and being operable for conducting current from the main electric source to the chuck, the power circuit including a rectifier in each input line, and the rectifiers having outputs connected with the chuck, and the power circuit further including back-to-back SCR's in each input line between the electric source and the rectifiers, and the power circuit thereby being operable for producing DC in a magging direction and in a demagging direction, the power circuit constituting the sole operable connection between the main electric source and the chuck to the exclusion of any transformers and capacitors therein, the power circuit being operable for imposing continuous DC on the chuck in overlapping relation of the phases of the AC, the control circuit being connected with the electric source, and means in the control circuit selectively actuatable and responsive to the level of charge in the chuck for controlling the SCR's and thereby controlling current in the power circuit to the chuck, and operable for shutting off that current at the end of flow thereof in a single direction when the charge on the chuck is substantially at a predetermined value.

2. Apparatus according to claim 1 in conjunction with a plurality of chucks wherein, the circuitry includes a plurality of circuit components, one for each of the chucks, and timer and counter means for putting the components individually in circuit with respective chucks and in successive order, and the circuitry being thereby operable for applying charges to the chucks in corresponding order.

3. Apparatus according to claim 1 in conjunction with a plurality of chucks, and including, means for connecting all the chucks in the power circuit, and means operable in response to a control step being performed for automatically producing a charge in charging direction individually and successively on the chucks.

4. Apparatus according to claim 1 in conjunction with a plurality of chucks, and including means for connecting all the chucks in the power circuit, and means operable in response to a control step being performed for automatically producing a charge in discharging direction individually and successively on the chucks.

5. Apparatus according to claim 1 wherein, the control circuit includes pulse transformers operably related to respective phases of the AC, and operable for controlling the respective back-to-back SCR's in the power circuit, and the control circuit includes control means, itself including means for sensing the current to the chuck, and a component capable of receiving a charge from the current, and the control means being operable for energizing the pulse transformers in response to the charge on said component reaching a predetermined value.

6. Apparatus according to claim 5 wherein, said component includes a capacitor capable upon discharge thereof for energizing the pulse transformers.

7. Apparatus according to claim 6 wherein, the control also includes manually settable means for selectively predetermining the value of the charge imposed on the 8. Apparatus according to claim 5 wherein, the control circuit includes control transformers corresponding to the three phases of the AC, the control circuit includes means for sensing the current to the chuck, between respective control transformers and corresponding pulse transformers, each sensing means including a component capable of receiving a charge from the current, and the control means being operable for energizing the pulse transformers in response to the charge on each component reaching a predetermined value.

9. Apparatus according to claim 8 wherein, the back-to-back SCR's are in the input lines downstream from the control transformers, whereby the control transformers are actuated directly by the main electric source independently of those SCR's.

10. Apparatus according to claim 1 wherein, means for producing a first charge on the chuck in a first, charging, direction of predetermined first voltage value, and means for producing a second charge on the chuck in a second, discharging, direction of voltage value greater than said first voltage value.

11. A method of controlling an electric permanent chuck comprising the steps, applying DC of predetermined first voltage value in a first, charging, direction to the chuck, and applying DC of a voltage higher than the first voltage in a single step to reduce the charge on the chuck to zero.

12. A method according to claim 11 and including the steps, providing a 3-phase 4-line AC source and three input lines from the respective phases of the AC source to the chuck to the exclusion of power transformers and capacitors, and connecting the input lines directly from the source to the chuck individually and successively to thereby apply a first charge to the chuck.

13. A method according to claim 12 and including the additional step, utilizing the last step of claim 12 for applying a second charge to the chuck in direction opposite the first charge and thereby discharging the chuck.

14. A method according to claim 13 and including the additional step, providing a plurality of chucks and a circuit including the chucks, and operating the circuit for applying the charges to the chucks, in the steps in claim 16, to the chucks individually and successively.

15. A method according to claim 14 and including the additional step, providing means for carrying out the steps of claim 17 automatically in response to a single control step.

* * * * *